US005385777A

United States Patent [19]

Higuchi et al.

[11] Patent Number: 5,385,777

[45] Date of Patent: Jan. 31, 1995

[54] POROUS FILM, PROCESS FOR PRODUCING THE SAME, AND USE OF THE SAME

[75] Inventors: Hiroyuki Higuchi; Kiichiro Matsushita; Minoru Ezoe; Toshihiko Shinomura, all of Osaka, Japan

[73] Assignee: Nitto Denko Corporation, Osaka, Japan

[21] Appl. No.: 39,907

[22] Filed: Mar. 30, 1993

[30] Foreign Application Priority Data

Mar. 30, 1992 [JP] Japan .................................. 4-106173
Jan. 11, 1993 [JP] Japan .................................. 5-002636

[51] Int. Cl.[6] .......................... B32B 5/18; H01M 2/16; C08J 5/18; C08L 23/04; C08L 23/10

[52] U.S. Cl. .............................. 428/316.6; 428/319.9; 428/318.4; 428/308.4; 428/315.7; 428/913; 428/931; 429/254; 521/134

[58] Field of Search ......................... 525/240; 521/134; 428/318.4, 319.9, 316.6, 913, 931

[56] References Cited

U.S. PATENT DOCUMENTS

| | | | |
|---|---|---|---|
| 3,679,538 | 7/1972 | Druin et al. | 161/159 |
| 3,801,140 | 4/1974 | Druin et al. | 156/229 |
| 3,952,073 | 4/1976 | Isaka et al. | 525/240 |
| 3,969,562 | 7/1976 | Suzuki | 428/155 |
| 4,839,228 | 6/1989 | Jezic et al. | 525/240 |
| 4,873,116 | 10/1989 | Ancker | 525/193 |
| 5,051,183 | 9/1991 | Takita et al. | 210/500 |

FOREIGN PATENT DOCUMENTS

| | | | |
|---|---|---|---|
| 0105629 | 4/1984 | European Pat. Off. . | |
| 0476198 | 3/1992 | European Pat. Off. . | |
| 63-308866 | 12/1963 | Japan | H01M 2/16 |
| 46-40119 | 11/1971 | Japan . | |
| 50111174 | 12/1973 | Japan | B29D 7/24 |
| 55-32531 | 8/1980 | Japan | B29D 7/24 |
| 59-37292 | 9/1984 | Japan | C08J 9/26 |
| 60-23954 | 2/1985 | Japan | H01M 2/16 |
| 62-10857 | 1/1987 | Japan | H01M 2/16 |
| 0221559 | 1/1990 | Japan | H01M 2/16 |
| 0275151 | 3/1990 | Japan | H01M 2/16 |
| 4206257 | 7/1992 | Japan . | |

OTHER PUBLICATIONS

Journal of App. Poly. Sci. vol. 26 "Drawing Behavior of Polyethylene–Polypropylene Blends". pp. 3515–3521 (1981).

Database WPI, Derwent Publications–Nitto Electric Ind. (1 page).

Patent Abstracts of Japanese Application JP4206257–Nov. 10, 1992 (1 page).

*Primary Examiner*—Carman J. Seccuro, Jr.
*Attorney, Agent, or Firm*—Sughrue, Mion, Zinn, Macpeak & Seas

[57] ABSTRACT

A porous film comprising a composition of 10 to 90% by weight of polypropylene and 10 to 90% by weight of polyethylene having an Mw/Mn ratio, as determined by high-temperature gel-permeation chromatography, of 10 or less is disclosed. The porous film has a high tensile modulus, a satisfactory appearance, and a uniform thickness. A battery separator comprising the porous film performs a shut-down function (an increase in resistance) in case of a temperature rise due to an abnormal current.

10 Claims, 5 Drawing Sheets

POROUS FILM, PROCESS FOR PRODUCING THE SAME, AND USE OF THE SAME

FIELD OF THE INVENTION

The present invention relates to a porous film, a process for producing the same, a battery separator comprising the porous film, and a battery using the porous film as a separator.

BACKGROUND OF THE INVENTION

Various types of batteries now available contain a shortproof separator between negative and positive poles. In recent years, lithium batteries have been attracting attention for applicability to cordless electronic equipment because of their high energy density, high electromotive force, and small self-discharge.

Materials of the negative pole of conventional lithium batteries include metallic lithium, lithium alloys with other metals, e.g., aluminum, organic materials capable of adsorbing a lithium ion, e.g., carbon or graphite, organic materials capable of occluding a lithium ion by intercalation and lithium ion-doped conductive polymers. Known materials of the positive pole of the lithium batteries include fluorinated graphite represented by the formula $(CF_x)_n$, metal oxides (e.g., $MnO_2$, $V_2O_5$, CuO and $Ag_2CrO_4$) and sulfides (e.g., $TiS_2$ and CuS).

Lithium as a negative pole constituent of lithium batteries has high reactivity, and the electrolytic solution used in lithium batteries is a solution comprising, as an electrolyte, $LiPF_6$, $LiCF_3SO_3$, $LiClO_4$ or $LiBF_4$, and an organic solvent, e.g., ethylene carbonate, propylene carbonate, acetonitrile, $\gamma$-butyrolactone, 1,2-dimethoxyethane or tetrahydrofuran. Therefore, should an abnormal current pass the battery due to external shortcircuiting or miss-connection, the battery temperature considerably rises, causing thermal damage to equipment in which the battery is integrated.

To avoid this, it has been proposed to use a separator comprising a porous film. For example, a porous film comprising polyethylene (hereinafter abbreviated as "PE") or polypropylene (hereinafter abbreviated as "PP") (see JP-A-60-23954 and JP-A-2-75151, the term "JP-A" as used herein means an "unexamined published Japanese patent application"), a porous film comprising a mixture of PE having an ordinary molecular weight and PE having a high molecular weight (see JP-A-2-21559), and a laminated porous film composed of different materials (see JP-A-62-10857 and JP-A-63-308866) have been proposed.

The purpose of using a single or laminated porous film as a battery separator resides in that the porous film interposed between a positive pole and a negative pole functions in a normal state to prevent shortcircuiting therebetween while suppressing electric resistance therebetween on account of its porous structure to maintain the battery voltage. On the other hand, where the inner temperature rises due to an abnormal current, the porous film changes into a non-porous film at a certain elevated temperature and thereby increases its electric resistance to shut the battery reaction whereby a further temperature rise can be prevented to ensure the safety.

A function of increasing electric resistance in case of a temperature rise due to an abnormal current to shut off a battery reaction thereby preventing a further temperature rise for security is generally called a shut-down (hereinafter abbreviated as "SD") function. An SD function is essential to separators for lithium batteries, etc.

In what follows, a temperature at which the resistivity of a battery separator reaches 200 $\Omega$.cm$^2$ is referred to as "SD initiation temperature". If an SD initiation temperature is too low, an increase in resistance initiates on a slight temperature rise, making the battery impractical. If it is too high, security is insufficient. It is accepted for the time being that an SD initiation temperature is preferably from about 110° to 160° C., and more preferably from about 120 ° to 150° C.

A battery separator is also demanded to retain the thus increased resistance up to an adequate temperature for security. The upper temperature limit up to which the increased resistance is retained will hereinafter be referred to as "heat resistance temperature", and the temperature latitude from an SD initiation temperature up to a heat resistance temperature, namely a difference between a heat resistance temperature and an SD initiation temperature, will hereinafter be referred to as "heat resistance range".

The heat resistance temperature of a separator may be regarded as an indication of a function of film form retention. If a separator is melted by heat, it no more retains its film shape and is broken, decreases its resistance, and loses its SD function. As a result, the positive and negative poles are short-circuited, resulting in a sudden temperature rise to cause thermal damage to the equipment. Therefore, from the safety consideration, it is required for a battery separator to have an SD initiation temperature ranging from about 110° to 160° C. and a high heat resistance temperature with a broad heat resistance range.

Besides the above-described SD function, it is basically required for a battery separator to have a low resistivity, high mechanical strength such as a tensile modulus, small unevenness in film thickness, and small variations in characteristics, such as resistivity.

Conventional porous films which can be used as a separator of lithium batteries include a porous PP film obtained by extruding PP at a high draft ratio (a quotient of a take-off speed of a film divided by an extrusion speed of a resin from a die), subjecting the extruded film to a heat treatment (annealing), followed by stretching (see JP-B-46-40119 (the term "JP-B" as used herein means an "examined published Japanese patent application"), JP-B-55-32531, and U.S. Pat. Nos. 3,679,538 and 3,801,404); a porous PE film obtained by molding a composition comprising PE having a specific molecular weight and a specific molecular weight distribution, an inorganic fine powder, and an organic liquid into a film, extracting the inorganic fine powder and the organic liquid from the film, followed by stretching (see JP-B-59-37292); and a biaxially stretched porous film comprising PP and PE (see JP-A-50-111174).

According to the inventors' experiments, a battery separator comprising the above-described porous PP film has an SD initiation temperature as high as 170° C. or more while that comprising the above-described porous PE film has a moderate SD initiation temperature of about 135° C. but a heat resistance temperature of at most 145° C. That is, either film has a need of further improvement for safety.

In addition, a porous PE film has a low tensile modulus of about 3200 kg/cm$^2$ or less and is therefore liable to elongation when integrated into a battery, thus failing to increase the production rate. Further, a porous film comprising a mixture of PE having an ordinary molecular weight and high-molecular PE shows improvements in characteristics but has a heat resistance of about 150° C. and a tensile modulus of about 3400 kg/cm$^2$, which are still insufficient.

A separator composed of laminated porous films of different materials seems to have improved SD characteristics. However, since the positions of fine pores of each film do not correspond with each other when laminated, the fine pores fail to connect the surface side to the back side and has increased resistance as a result. Where the films are laminated with an adhesive, part of the numerous pores are clogged with the adhesive, which also results in an increase of resistance. Moreover, a laminated film has a so increased thickness, which goes against the contemporary trend to size reduction and increase of energy density of batteries.

According to JP-A-50-111174 supra, the biaxially stretched porous film comprising PP and PE disclosed therein becomes transparent on about 1-minute's immersion in methanol at room temperature. From the fact that a porous film used as a battery separator usually becomes transparent almost in the instant of being immersed in methanol, it appears that the porous film of JP-A-50-111174 has a low degree of porosity and accordingly too high electric resistance for practical use.

The inventors have continued extensive studies to overcome the above-described problems associated with the conventional techniques, i.e., the low heat resistance and insufficient mechanical strength of a separator comprising a porous PE film and the high SD initiation temperature of a separator comprising a porous PP film.

In the course of their study, they previously proposed a porous film separator comprising a mixture of PE and PP as disclosed in JP-A-4-206257. The proposed battery separator exhibits improved SD characteristics as compared with the conventional ones by virtue of the PE/PP combined use and application of a novel process for film production. Nevertheless, the PE/PP mixed porous film still has room for further improvements in, for example, reducing electric resistance and wrinkle.

SUMMARY OF THE INVENTION

One object of the present invention is to provide a porous film which exhibits sufficient levels of characteristics for practical use, such as SD initiation temperature, heat resistance temperature, heat resistance range, electric resistance, and mechanical strength, and has a satisfactory appearance free from wrinkles and is therefore useful as a battery separator.

Another object of the present invention is to provide a process for producing the above-described excellent porous film.

A further object of the present invention is to provide a battery separator comprising the above-described porous film.

A still further object of the present invention is to provide a battery using the above-described porous film as a separator.

As a result of further studies, the inventors have found that the above objects of the present invention are accomplished by using PE with specific physical properties as a film-forming material.

The present invention relates to a porous film comprising a composition comprising PP and PE, the PP being present in a proportion of from 10 to 90% by weight based on the total weight of PP and PE, the PE being present in a proportion of from 90 to 10% by weight based on the total weight of PP and PE, and the PE having a weight average molecular weight (Mw) to number average molecular weight (Mn) ratio, Mw/Mn, of 10 or less as measured by high-temperature gel-permeation chromatography (hereinafter abbreviated as "high-temperature GPC").

DETAILED DESCRIPTION OF THE INVENTION

Figure 1:
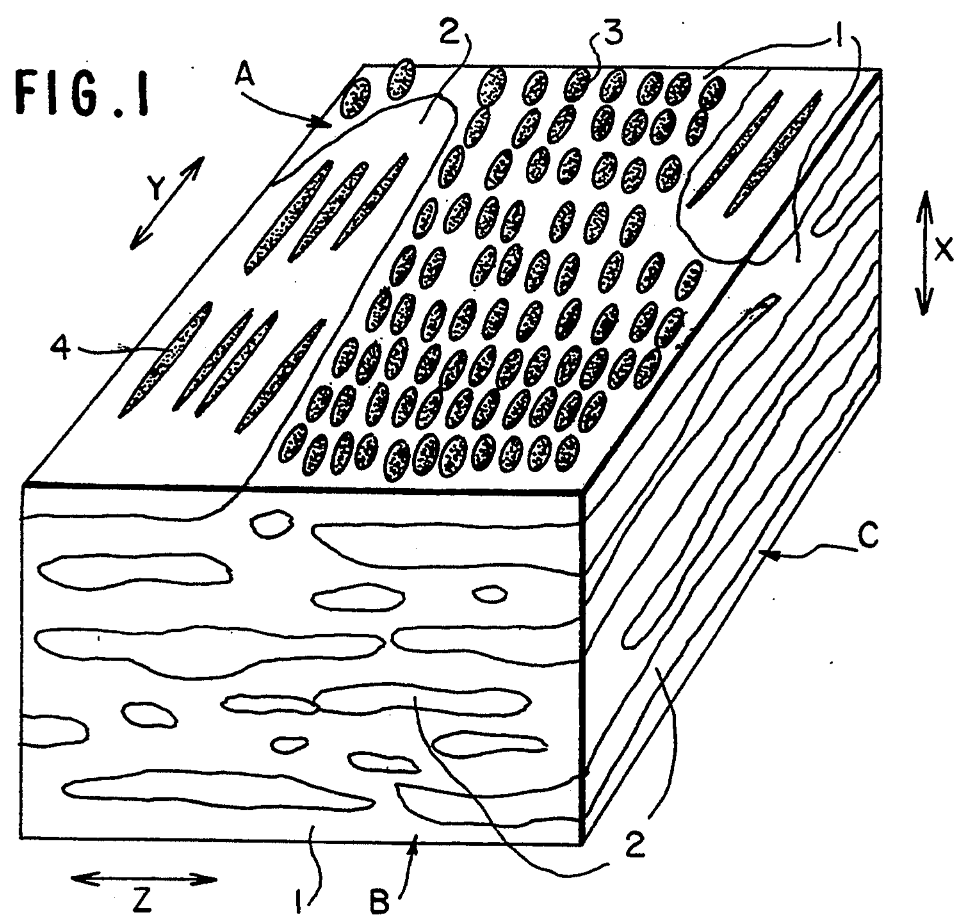
FIG. 1 is a schematic illustration of the microstructure of the porous film according to the present invention.

The porous film according to the present invention comprises a composition comprising PP and PE, with the PP being present in a proportion of from 10 to 90%, preferably from 40 to 80%, and more preferably from 45 to 75%, by weight based on the total weight of PP and PE and the PE being present in a proportion of from 10 to 90%, preferably from 20 to 60% of and more preferably from 25 to 55%, by weight on the same basis.

The weight proportion of PP or PE in the porous film influences the SD initiation temperature, heat resistance temperature and heat resistance range when applied as a battery separator. In general, while somewhat depending on the melting point, etc., of PP or PE, as the proportion of PP increases, the heat resistance temperature increases with an increase in SD initiation temperature; and as the proportion of PP decreases, the heat resistance temperature decreases. From this standpoint, it is essential that the proportions of PP and PE should fall within the above-specified respective ranges. If the PP's proportion exceeds 90%, not only is the SD initiation temperature too high but the resistance-increasing effect at a prescribed temperature is insufficient. If it is less than 10%, the heat resistance temperature decreases while narrowing the heat resistance range.

PE as one of the film constituents includes high-density PE, middle-density PE, low-density PE, linear low-density PE, and ethylene-vinyl compound copolymers. The vinyl compound includes vinyl acetate, methyl acrylate, methyl methacrylate, vinyl chloride, and styrene. Of those PE resins, preferred is high-density PE having high crystallinity. With the PE's proportion being 50% or less based on the total weight of PP and PE, PE resins of low crystallinity, such as medium-density PE, low-density PE, linear low-density PE, and ethylene-vinyl compound copolymers, are also employable as well as high-density PE.

It is important that PE used should have an Mw/Mn ratio of 10 or less as measured by high-temperature GPC. If the Mw/Mn ratio exceeds 10, it is difficult to obtain a film free from thickness unevenness, and the film is liable to tearing on stretching.

PP as the other film constituent preferably includes PP having high stereoregularity. Where the PP's proportion is low, for example, less than 50% based on the total weight of PP and PE, propylene-ethylene copolymer resins or PP resins having a high content of a less stereoregular atactic structure can also be used as well to produce satisfactory results.

If desired and necessary, the composition comprising PP and PE may further contain appropriate amounts of additives, such as surfactants, antioxidants, plasticizers, flame retardants, coloring agents, and compatibilizers for improving compatibility between PP and PE. If desired and necessary, the porous film may be rendered hydrophilic by, for example, graft copolymerization of a polar monomer, such as acrylic acid, methyl acrylate, methacrylic acid, methyl methacrylate, or vinyl acetate, or impregnation with a surface active agent.

Examples of suitable surfactants for rendering the film hydrophilic include anionic surfactants, such as higher fatty acid alkali salts, alkylsulfates, alkylsulfonates, alkylarylsulfonates, and sulfosuccinic ester salts; cationic surfactants, such as higher amine halogenic acid salts, alkylpyridinium halides, and quaternary ammonium salts; and nonionic surfactants, such as polyethylene glycol alkyl ethers, polyethylene glycol fatty acid esters, sorbitan fatty acid esters, and fatty acid monoglycerides.

The porous film according to the present invention is suitably used as a battery separator. The separator comprising the porous film of the present invention is similar to the conventional PE or PP porous films in terms of porosity but different from them in the mechanism for exhibiting the SD function.

The conventional separators change from a porous structure into a non-porous structure on melting when reaching the softening or melting point of PE or PP, which leads to an increase in electric resistance, resulting in shut-down of the current. Accordingly, their SD characteristics depend on the softening or melting point of the PE or PP constituting the separator. This is the very reason why a separator made of a porous PE film has a low heat resistance temperature while a separator made of a porous PP film has too a high SD initiation temperature. Moreover, both the PE and PP porous films have a narrow heat resistance range, that is, the SD initiation temperature and the heat resistance temperature are close to each other, also arising much fear as to safety.

To the contrary, when the separator comprising the porous film according to the present invention, which comprises PP and PE having specific physical properties, reaches the softening or melting point of PE, the PE portion constituting the separator is softened or melted. Where the PE portion is porous, the PE portion loses its porous structure to increase the resistivity. Where the PP portion also has a porous structure, the softened or molten PE clogs the PP porous structure. As a result, the resistivity increases to shut off the current to thereby prevent a further temperature rise. Meanwhile, the film shape can be retained by the PP portion until the temperature reaches the melting point of PP thereby exhibiting sufficient heat resistance (i.e., a sufficiently high heat resistance temperature).

Thus, in using the porous film of the present invention as a battery separator, the PE portion mainly contributes to a rise of an SD initiation temperature and an increase of resistivity while the PP portion mainly contributes to a rise of a heat resistance temperature, thereby providing a separator of high safety. The separator according to the present invention utterly differs from the conventional ones in that two constituent materials perform different functions to exert excellent practical utility in combination.

For use as a battery separator, the porous film of the present invention is interposed between a positive pole and a negative pole and assembled into a battery in a conventional manner. Materials of constituent elements, such as a positive pole, a negative pole, a battery case, an electrolytic solution, etc., and structural designs of these elements are not particularly limited, and any and every conventional technique can be applied.

The process of the present invention which can be used for producing the above-described porous film, which is a novel process developed by the inventors, comprises molding a composition comprising PP having a melting point of $Tm_a$°C. and PE having a melting point of $Tm_b$°C. to obtain a film, subjecting the film to annealing at a temperature ranging from $Tm_b$°C. to $(Tm_a+10)$°C., and stretching the film at a temperature ranging from −20° C. to 60° C. to make it porous.

Film formation from the composition can be conducted by conventional methods for thermoplastic resin film formation, such as T-die extrusion and blown-film extrusion. While molding conditions are not particularly limited, a draft ratio (or a draw ratio or a drawdown ratio) is usually 20 or more, and preferably 50 or more, and a take-off speed usually ranges from 5 to 200 m/min, and preferably from 10 to 100 m/min. There is a correlation between a take-off speed and a draft ratio. The take-off speed being set high, the draft ratio can be reduced, and vice versa. The draft ratio (D) as referred to herein is a quotient obtained by dividing a take-off speed ($V_2$) by a linear velocity of a resin extruded from a die ($V_1$) as represented by equation:

$$D = \frac{V_2}{V_1}$$

A composition comprising PP and PE and, if desired, necessary additives is melt-kneaded in a twin-screw extruder, a kneader, a Banbury mixer, etc., and then molded into a film by T-die extrusion or blown-film extrusion.

PP is used in a proportion of from 10 to 90%, and preferably from 40 to 80%, by weight based on the total weight of PE and PP. It is preferable to use PE having an Mw/Mn ratio of 10 or less as measured by high-temperature GPC.

As previously described, while the draft ratio in film formation is not critical, it is usually set at 500 or less from the standpoint of film-forming properties. When necessary, a higher draft ratio may also be employed. The inventors have confirmed that resistivity of the resulting porous film increases as the draft ratio decreases and reaches a level substantially acceptable for practical use when the draft ratio is set at about 20 or more. From these considerations, the draft ratio is usually set in the range of from about 20 to 500 in practice.

It is known that a crystalline polymer exhibits a row structure in which lamellae are arranged in rows in the vertical direction perpendicular to the take-off direction (see H. S. Bierenbaum, et al., *Ind. Eng. Chem., Prod. Res. Develop.*, Vol. 13, No. 1, p. 2 (1974)). It has been ascertained that the film molded by the above-described molding process also has the same structure.

According to the process of the present invention, the thus obtained film is subjected to annealing whereby formation of fine pores during the subsequent stretching step is accelerated to obtain a porous film of high porosity.

Annealing can be conducted by any method, for example, a method for contacting the film with a heated roll or a heated metal plate, a method for heating the film in air or an inert gas, or a method for winding the film around a core and heating the film in roll form in a gaseous phase. Blocking of the film in roll form may be prevented by winding the film together with a release sheet. Usable release sheets include heat resistant films, such as a polyethylene terephthalate film and a fluorine resin film, and paper or plastic films coated with a release agent, e.g., a silicone resin.

The annealing temperature is set between $Tm_b$°C. and $(Tm_a 10)$°C. A suitable annealing temperature in that range depends on the annealing method employed. For example, a suitable annealing temperature is from $Tm_b$°C. to $(Tm_a-5)$°C. in the method for contacting a film with a heated roll or metal plate; from $Tm_b$°C. to $(Tm_a+5)$°C. in the method for heating a film in air or an inert gas; or from $Tm_b$°C. to $(Tm_a+10)$°C. in the method for heating a film in roll form in air.

The annealing aims at making the row structure of lamellae formed during the film formation further grow to thereby accelerate fine pore formation in the subsequent stretching step. It was supposed therefore that the annealing temperature for further growth of the crystal structure (i.e., a row structure of lamellae) of a film comprising PE and PP having different melting points would naturally be set lower than the melting point of PE. To our surprise, however, it turned out that the annealing temperature should be set at a temperature higher than the melting point of PE, i.e., in the above-specified temperature range. If the annealing temperature is too low, the lamellae do not sufficiently grow to only provide a porous film having a high resistivity. If the temperature is too high, on the other hand, not only does the crystal structure disappear but the phase separation structure becomes so rough that the resulting film is brittle and it is difficult to stretch the film.

The time required for annealing is selected appropriately according to the proportions of PE and PP in the film, the annealing temperature, and so on. It usually ranges from about 2 seconds to 50 hours, and preferably from 10 seconds to 20 hours.

After annealing, the film is stretched by any conventional method, such as stretching between rolls or stretching by means of a tenter. The stretching is conducted at a temperature of from −20° to 60° C. (the stretching in this temperature range will hereinafter referred to as "low-temperature stretching"). At a stretching temperature below that range, the film tends to break during stretching. At too a high temperature, the film hardly attains porosity. From the standpoint of stretching workability, a preferred stretching temperature is from −20° to 55° C.

While not limiting, a stretch ratio of low-temperature stretching ($M_1$; %) usually ranges from 20 to 400%, and preferably from 50 to 300%. The terminology "stretch ratio" ($M_1$) as used herein is defined by equation:

$$M_1 = \frac{L_1 - L_0}{L_0} \times 100$$

wherein $L_0$ is a dimension before low-temperature stretching, and $L_1$ is a dimension after low-temperature stretching.

The thus obtained porous film has a special microstructure as can be observed under an electron microscope as hereinafter described. For microscopic observation, it is recommended to stain the porous film by contacting with vapor of a ruthenic acid aqueous solution.

The surface of the porous film is first observed under a scanning electron microscope (SEM) at a magnification of from about 1,000 to 30,000. Then, the porous film is cut along the direction perpendicular to the take-off direction (cross direction) and the direction parallel to the take-off direction (longitudinal direction) and each cut surface is observed under a transmission electron microscope (TEM) at a magnification of from about 5,000 to 100,000.

The observation on the surface and two cut surfaces (cross section and longitudinal section) reveals that a PP portion and a PE portion independently exist to form a phase separation structure in which one of the PP portion and PE portion constitutes a continuous phase with the other forming a discontinuous phase or a dispersed phase, with at least the portion constituting a continuous phase having a porous structure.

Such a microstructure of the porous film according to the present invention is unknown and entirely different from those of conventional porous films comprising a single component or a mixture of polymers of similar kind.

The results of microscopic observations on the porous film of the present invention will be described below in more detail. The surface observation with SEM reveals that there exist a number of lamellae (crystals) aligned in the direction substantially perpendicular to the take-off direction and a number of fine fibers (fibrils) parallel to the take-off direction which connect neighboring lamellae to form fine pores between the fibers.

The PE portion and the PP portion can be discriminated by differences in pore shape and lamella shape. For example, where both the PP and PE portions have a porous structure, the pores of the PE portion have a greater pore size than those of the PP portion, and the lamellae of the PP portion have a regular shape whereas those of the PE portion have an irregular shape. The PE portion and the PP portion can thus be distinguished from each other on the surface of the porous film.

Discrimination between a PE portion and a PP portion is easier in observation on the cross and longitudinal sections than in surface observation because the PE portion is stained more easily and looks blacker than the PP portion. It is seen by observing the longitudinal section that at least the continuous phase is porous with the discontinuous phase being porous or non-porous. The longitudinal section is suitable for observation of the alignment of the lamellae and the fine pores of the resin portion constituting the continuous phase.

In a preferred embodiment, the phase separation structure of the porous film comprises a continuous phase formed of a PP portion and a discontinuous phase formed of a PE portion. When the porous film exhibits this embodiment, it was confirmed that the film has the most preferred SD initiation temperature and a high heat resistance temperature. As a matter of course, the PP portion forming the continuous phase in this embodiment has a porous structure. The PE portion forming the discontinuous phase may be either porous or non-porous but is preferably porous for exhibiting lower electric resistance.

The porous film according to the present invention may also have a phase separation structure other than the above-specified microstructure. That is, as far as a PP portion and a PE portion independently exist, the PE portion may form a porous continuous phase with the PP portion forming a discontinuous phase which is either porous or non-porous.

The microstructure of the porous film produced by the above-described process is decided primarily by the mixing ratio of PE and PP and the melt viscosity of the resin. There is a tendency that a resin having a larger proportion forms a continuous phase and that a resin having a lower melt viscosity forms a continuous phase.

Accordingly, the microstructure of the porous film can be controlled by varying the PP and PE mixing ratio or by appropriately combining PP and PE differing in melt viscosity. For example, where PP is present in a larger proportion, PP tends to form a porous continuous phase while PE tends to form a discontinuous phase. In this case, when medium-density PE or low-density PE is used, the discontinuous phase formed of PE becomes non-porous, while in using high-density PE, the discontinuous phase becomes porous.

The porous film according to the present invention has a tensile modulus as high as 3,500 kg/cm$^2$ or more in at least one direction and hardly shows elongation when integrated into a battery as a separator so that efficiency in battery assembly can be improved and the rejection rate of batteries can be reduced.

In FIG. 1 is shown a schematic microstructure of the porous film according to the most preferred embodiment. Arrows X, Y, and Z show the thickness direction, the take-off direction (longitudinal direction), and the direction perpendicular to both the take-off direction and the thickness direction (cross direction), respectively. A, B, and C indicate the porous film surface, the cross section (parallel to the X-Z plane), and the longitudinal section (parallel to the X-Y plane) of the film, respectively.

On each of surface A, section B, and section C, PP portion 1 and PE portion 2 independently exist, showing a phase separation structure in which PP portion 1 forms a continuous phase with PE portion 2 forming a discontinuous phase. Both PP portion 1 and PE portion 2 are porous. Such a microstructure comprising a continuous phase interspersed with discontinuous phase may be called a "sea-island structure".

Numerals 3 and 4 indicate fine pores in PP portion 1 and PE portion 2, respectively, on surface A. While not shown in FIG. 1, similar fine pores are also observed in PP portion 1 and PE portion 2 on sections B and C.

PE portion 2 often exists in the form of a thin, long and narrow layer like a band, a rod or a string along direction Y. The form of PE portion 2 mainly depends on the PE content of the porous film. Accordingly, as the PE content increases, the PE portion widens to become band-like, and as the PE content decreases, the PE portion narrows to become rod-like or string-like.

PE portion 2 usually measures from about 0.1 μm to several tens of microns long in Y direction as can be seen by observation of surface A or section C, from about 0.2 to 5 μm across in Z direction as can be seen by observation of surface A or section B, and from about 0.1 to 2 μm thick in X direction as can be seen by observation of section B or C.

Fine pores 3 and 4 in PP portion 1 and PE portion 2 each have an ellipsoidal or rectangular shape. Fine pores 3 in PP portion 1 usually measure from about 0.05 to 0.3 μm in longer diameter and from about 0.01 to 0.1 μm in shorter diameter, and fine pores 4 in PE portion 2 usually measure from about 0.1 to 3 μm in longer diameter and from about 0.02 to 0.5 μm in shorter diameter.

When used as a battery separator, the porous film having the above-illustrated pore sizes and shapes in the PP and PE portions effectively prevents dendrites of lithium developed on reduction and precipitation from entering the inside of the separator.

The porous film of the present invention may also be obtained by a process comprising molding a composition comprising PP and PE into a film, subjecting the film to annealing and then to low-temperature stretching in the same manner as described above and then re-stretching the resulting porous film at a temperature ranging from 60° C. to ($Tm_b$ −5)°C. (the stretching at that temperature will hereinafter be referred to as "high-temperature stretching").

The high-temperature stretching includes uniaxial stretching and biaxial stretching. The stretching direction may be the same or different from that of the low-temperature stretching. If the temperature of the second stretching step is lower than 60° C., the film tends to break. If it is higher than ($Tm_b$−5)°C., the resulting porous film has an increased resistivity.

The porous film obtained by the high-temperature stretching has a higher porosity as compared with that obtained only by the above-described low-temperature stretching while assuming the same microstructure and thereby exhibits further reduced electric resistance. The stretch ratio ($M_2$; %) of high-temperature stretching usually ranges from about 10 to 500% as calculated from equation:

$$M_2 = \frac{L_2 - L_1}{L_0} \times 100$$

wherein $L_2$ is a dimension after high-temperature stretching, $L_1$ is a dimension after low-temperature stretching, i.e., a dimension before high-temperature stretching, and $L_0$ is the same as defined before.

Since the stress exerted on low-temperature stretching or high-temperature stretching remains in the porous film obtained, the stretched film tends to shrink in the stretching direction. The dimensional stability of the stretched porous film may be improved by subjecting the stretched film to thermal shrinkage in the stretching direction. The thermal shrinkage is preferably performed at approximately the same temperature as used in the stretching. While not limiting, the stretched film is usually shrunk to such a degree that the stretched film length is reduced by about 15 to 35%.

The dimensional stability of the stretched porous film may also be improved by subjecting the stretched film to heat setting at the same temperature as used for stretching or higher temperatures while fixing the dimension in the stretching direction. The stretched porous film may be subjected to both of the above-described thermal shrinkage and heat setting.

The thus obtained porous film of the present invention has a low resistivity of 5 Ω.cm$^2$ or less as measured in an organic electrolytic solution at room temperature and is therefore advantageous as a battery separator.

When heated to a temperature within a range of from 120° to 150° C., the battery separator comprising the porous film of the invention increases its resistivity several tens to several hundred times over that exhibited at room temperature, reaching 200 Ω.cm$^2$ or higher per unit separator and thus manifests excellent SD characteristics. Further, the thus increased resistance was confirmed to be maintained up to a temperature higher than the SD initiation temperature by at least 25° C., indicating a high heat resistance temperature and was proved highly safe.

The porous film according to the present invention is widely applicable not only as a battery separator but also as a filter for membrane separation, a constructive air-permeable film, a clothing air-permeable film, and the like.

The present invention is now illustrated in greater detail with reference to Examples, but it should be understood that the present invention is not deemed to be limited thereto. All the percents and ratios are by weight unless otherwise indicated. "Mw" and "Mn" mean a weight average molecular weight and a number average molecular weight, respectively.

Physical properties of PE and PP used in Examples and Comparative Examples were determined as follows.

1) Molecular Weight (Mw, Mn)

High-temperature GPC was conducted at 135° C. using o-dichlorobenzene as a solvent, a chromatograph "GPC-150C" manufactured by Waters Co., and a column "Shodex KF-80M" manufactured by Showa Denko Co., Ltd. The data were processed by GPC data processing system manufactured by TRC Co. Molecular weight (Mw or Mn) was calculated on a polystyrene standard.

2) Melting point (mp)

A differential scanning calorimeter "DSC 200" manufactured by Seiko Denshi Kogyo Co., Ltd. was used for measurement. PE or PP was heated from room temperature up to 220° C. at a rate of temperature rise of 10° C./min, kept at 220° C. for 30 minutes, cooled at a cooling rate of about 2° C./min, and then again heated at a rate of 10° C./min. The endothermic peak in this thermal history was taken as an mp.

3) Melt Index (MI; g/10 min)

Measured in accordance with ASTM D 1238.

4) Density (d; g/cm$^3$)

Measured in accordance with ASTM D 1505.

Physical and electrical properties and SD characteristics of the porous films produced were determined as follows.

5) Tensile Modulus

Stress at 5% strain was measured with an autographic recording device "AG-2000A" manufactured by Shimazu Seisakusho Ltd. at a temperature of 25° C. and at a pulling speed of 20 mm/min with a chuck distance of 100 mm. The specimen had a width of 10 mm.

6) Electric Resistance

Measured in accordance with JIS C 2313. A 1 mol/l solution of anhydrous lithium perchlorate in an equal volume mixture of propylene carbonate and 1,2-dimethoxyethane was used as an electrolytic solution.

An AC resistance of the porous film at 1 kHz was measured with a resistance meter "LCR meter KC-532" manufactured by Kokuyo Denki Kogyo Co., Ltd. to obtain a resistivity R (Ω.cm$^2$) according to equation:

$$R=(R_1-R_0)\times S$$

wherein $R_0$ is a resistivity (Ω) of the electrolytic solution; $R_1$ is a resistivity (Ω) of a porous film soaked in the electrolytic solution; and S is a sectional area (cm$^2$) of the porous film.

Incidentally, because the resistance measuring cell used here is attended by a slight leakage of current, the upper limit of measurement is no higher than about 600 Ω.cm$^2$ even with a completely pore-free film.

7) SD Characteristics

The porous film with its two sides fixed so as to have a fixed longitudinal direction (take-off direction) was placed in a furnace maintained at a prescribed temperature. After being thus heated for 15 minutes, the film was taken out of the furnace, and the electric resistance was measured.

EXAMPLE 1

Isotactic PP having an mp of 166° C., an MI of 2.5 (g/10 min) and an Mw/Mn ratio of 8.5 and an equal weight of high-density PE having an mp of 139° C., an MI of 0.75, and an Mw/Mn ratio of 8.6 were melt-mixed and extruded from a T-die extruder (die lip gap: 3 mm) at a die temperature of 230° C., a take-off speed of 40 m/min, and a draft ratio of 160 to obtain a 38 μm thick film of continuous length. The resulting film was satisfactorily free from unevenness in external appearance and thickness.

The film was wound around a glass tube together with a 50 μm thick polyethylene terephthalate release film, and the film roll was subjected to annealing in a drier kept at 167° C. for 2 hours.

After the annealing, the film was unwound and subjected to low-temperature stretching at 25° C. in the longitudinal direction (the take-off direction) to a stretch ratio of 200% and then high-temperature stretching at 95° C. in the same direction to a stretch ratio of 200%.

The stretched film was made to shrink in an atmosphere set at 95° C. so as to reduce the film length in the stretching direction by 20% and further subjected to heat setting by heating at that temperature for 2 minutes while controlling the dimension in the stretching direction not to change.

The resulting porous film assumed a pearly luster. Observations of the longitudinal and cross sections with TEM revealed a phase separation structure comprising independent PP portion and PE portion as shown in FIG. 1 in which the PP portion formed a porous continuous phase interspersed with the PE portion forming a discontinuous phase having a thickness of about 0.1 to 1 μm. The PE portion also had a porous structure.

When the surface of the film was observed with SEM, the largest pore (ellipsoid) in the PP portion had a shorter diameter of about 0.1 μm and a longer diameter of about 0.3 μm, and the largest pole (ellipsoid) in the PE portion had a shorter diameter of about 0.3 μm and a longer diameter of about 2 μm.

Figure 2:
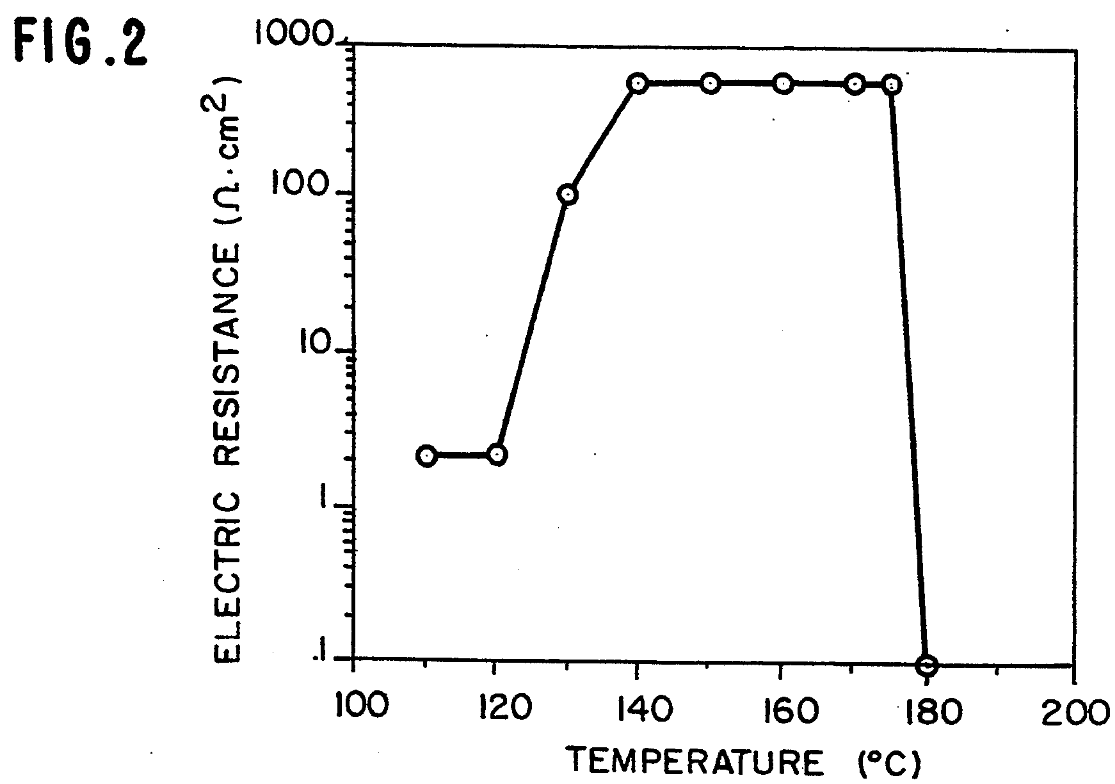
FIGS. 2 to 4 are each a graph showing the SD characteristics of the porous film according to the present invention.

The porous film had a thickness of 29 μm with a satisfactory appearance free from unevenness. The film had a tensile modulus of 4,900 kg/cm$^2$ in the stretching direction and a resistivity of 2.2 Ω.cm$^2$ at room temperature. The SD characteristics of the porous film are shown in FIG. 2.

Comparative Example 1

Isotactic PP (mp: 161° C.; Mw/Mn=11.3; MI: 2.5) and an equal weight of high-density PE (mp: 141° C.; Mw/Mn=10.6; MI: 0.70; d: 0.959) were melt-mixed and extruded from a T-die extruder (T-die lip gap: 2.5 mm) at a die temperature of 230° C. and taken up at a take-off speed of 50 m/min at a draft ratio of 140 to obtain a film of continuous length.

The resulting film had a very uneven appearance with transparent islands (2 to 10 mm wide and 5 to 60 mm long each with its lengthwise direction paralleling the take-off direction) interspersed in a less transparent and milky white portion. The island portion suffered from considerable wrinkles. Further, the film thickness had a large scatter between 27 and 53 μm, averaging 40 μm.

The film with its four sides fixed was subjected to annealing in a drier maintained at 120° C. for 1 hour and stretched first at 25° C. at a stretch ratio of 50% in the longitudinal direction and then at 100° C. at a stretch ratio of 100% in the same direction. Further, the stretched film was subjected to heat setting at 100° C. for 5 minutes under control not to change the dimension in the stretching direction.

The annealing, stretching and heat setting only caused the film to get slightly whitened to provide a film having a thickness varying from 9 to 18 μm, averaging 13 μm. The electrical resistance of the film, while considerably varying among different locations of measurement, averaged as high as 46 $\Omega.cm^2$ and was unsuitable as a battery separator.

Comparative Example 2

A film was molded in the same manner as in Comparative Example 1, except that the PP to PE weight ratio was changed to 70:30 and the draft ratio was set at 120. The resulting film, measuring 27 μm in thickness, was practically satisfactory except for slight unevenness in transparency.

The film was subjected to annealing, stretching and heat setting in the same manner as in Comparative Example 1 to obtain a whitened porous film having a thickness of 13 μm with slight unevenness in appearance. The electrical resistance of the film, while considerably varying among different locations of measurement, averaged as high as 64 $\Omega.cm^2$ and was unsuitable as a battery separator.

Comparative Example 3

The same isotactic PP as used in Comparative Example 1 and an equal weight of high-density PE (mp: 142° C. Mw/Mn=16.8, MI: 0.70, d: 0.964) were melt-mixed and molded from a T-die extruder (lip gap: 2.3 mm) at a die temperature of 250° C., at a take-off speed of 14 m/min and at a draft ratio of 110 to obtain a film of continuous length.

The resulting film comprised a milky white main portion interspersed with 2 to 8 mm wide and 5 to 60 mm long transparent islands similarly to the film of Comparative Example 1. The island portion suffered from many wrinkles. The film thickness largely scattered between 24 μm and 44 μm, averaging 33 μm. The milky white portion was thick, and the transparent portion was thin.

The film was subjected to annealing at 115° C. for 30 minutes, stretched in the longitudinal direction at 25° C. to a stretch ratio of 150%, and then heated at 90° C. for 2 minutes under control so as not to change the dimension in the stretching direction.

The resulting stretched film had a thickness varying from 11 μm to 25 μm, averaging 18 μm, and a resistivity of 7.6 $\Omega.cm^2$.

Comparative Example 4

The same film as molded in Comparative Example 3 was subjected to annealing at 165° C. for 10 minutes in the same manner as in Comparative Example 1 and stretched first at 25° C. to a stretch ratio of 200% in the longitudinal direction (low-temperature stretching) and then at 110° C. to a stretch ratio of 150% in the same direction (high-temperature stretching), and then subjected to heat setting at 100° C. for 5 minutes under control so as not to change the dimension in the stretching direction. Under these conditions, workability in the low-temperature stretching and high-temperature stretching was very poor because the film was so liable to breakage that the operation had to be carried out very carefully. Moreover, the resulting film had a very uneven appearance with white portions and transparent portions being mixed up and had a greatly varying thickness. The resistivity of the film was 1.5 $\Omega.cm^2$.

EXAMPLE 2

A satisfactory film having a thickness of 35 μm was obtained by molding in the same manner as in Example 1, except for changing the PP to PE weight ratio to 60:40 and setting the draft ratio at 180. The film was subjected to annealing at 160° C. for 10 minutes in the same manner as in Comparative Example 1 and stretched first at 25° C. to a stretch ratio of 200% in the longitudinal direction and then at 110° C. to a stretch ratio of 200% in the same direction. The stretched film was subjected to heat setting at 110° C. for 5 minutes while controlling not to change the dimension in the stretching direction to obtain a porous film.

The resulting porous film assumed a pearly luster. The observations of a longitudinal section and a cross section under TEM revealed a phase separation structure comprising independent PP portion and PE portion similarly to the porous film of Example 1, in which the PP portion formed a porous continuous phase interspersed with the PE portion forming a porous discontinuous phase.

By the surface observation under SEM, it was found that the largest pore in the PP portion had a shorter diameter of about 0.05 μm and a longer diameter of about 0.2 μm, and the largest pore in the PE portion had a shorter diameter of about 0.2 μm and a longer diameter of about 1 μm.

Figure 3:
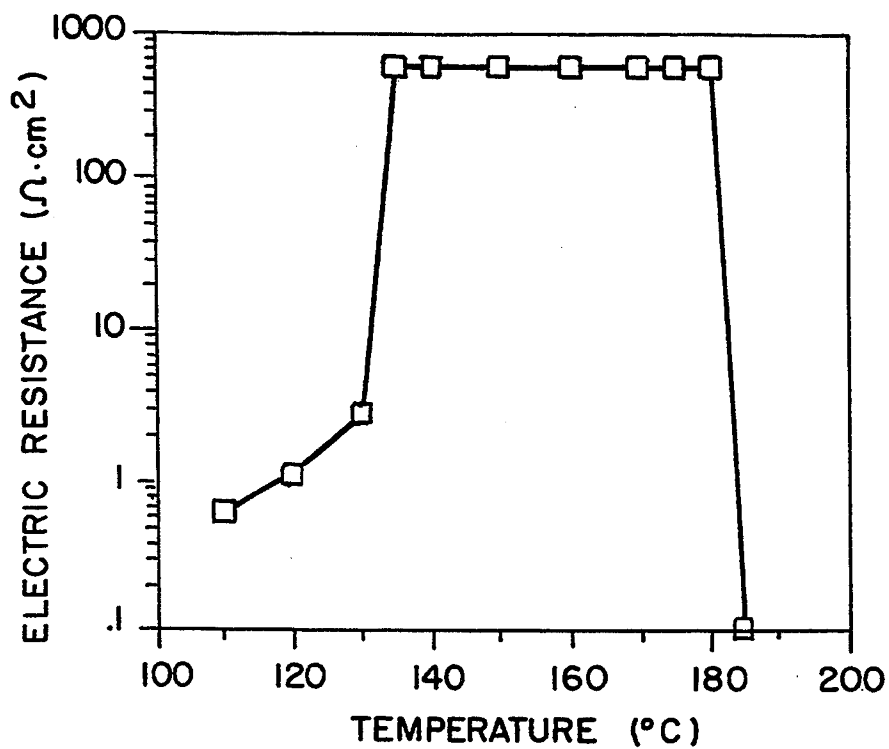

The porous film had a thickness of 24 μm with a satisfactory appearance free from unevenness. The film had a tensile modulus of 5,300 $kg/cm^2$ in the stretching direction and a resistivity of 2.1 $\Omega.cm^2$. The SD characteristics of the porous film are shown in FIG. 3.

EXAMPLE 3

A 47 μm thick film was obtained by molding in the same manner as in Example 1, except for changing the PP to PE weight ratio to 70:30 and setting the draft ratio at 130. The film was subjected to annealing at 165° C. for 30 minutes in the same manner as in Comparative Example 1 and stretched first at 25° C. to a stretch ratio of 200% in the longitudinal direction and then at 100° C. to a stretch ratio of 100% in the same direction. The stretched film was subjected to heat setting at 100° C. for 5 minutes while controlling not to change the dimension in the stretching direction to obtain a porous film.

The resulting porous film assumed a pearly luster. The observation of a longitudinal section under TEM revealed a phase separation structure comprising independent PP portion and PE portion in which the PP portion formed a porous continuous phase interspersed with a rod-like to stringy discontinuous phase of the PE portion. Even by surface observation under SEM, it was difficult to tell whether the PE portion was porous or not.

The largest pore in the PP portion had a shorter diameter of about 0.1 μm and a longer diameter of about 0.2 μm as measured by surface observation under SEM.

Figure 4:
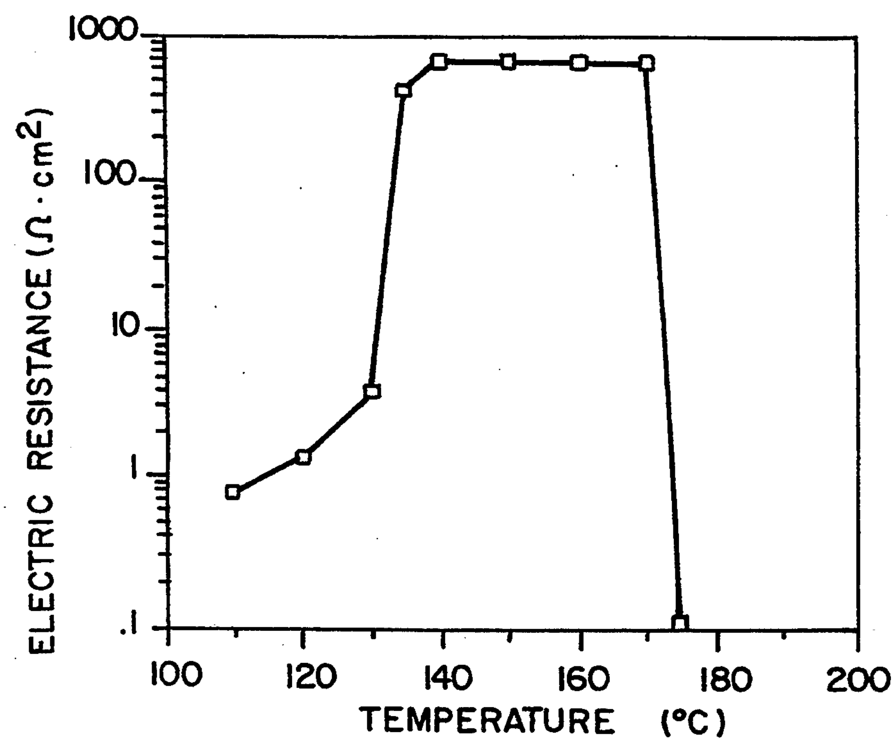

The porous film had a thickness of 30 μm with a satisfactory appearance free from unevenness. The film had a tensile modulus of 6,400 kg/cm$^2$ in the stretching direction and a resistivity of 0.67 Ω.cm$^2$. The SD characteristics of the porous film are shown in FIG. 4.

EXAMPLE 4

In order to examine the influence of the annealing temperature on SD characteristics, the same film as used in Example 3 with its four sides fixed was subjected to annealing at a temperature varying from 130° C. to 165° C. by 5° C. each for 30 minutes.

Figure 5:
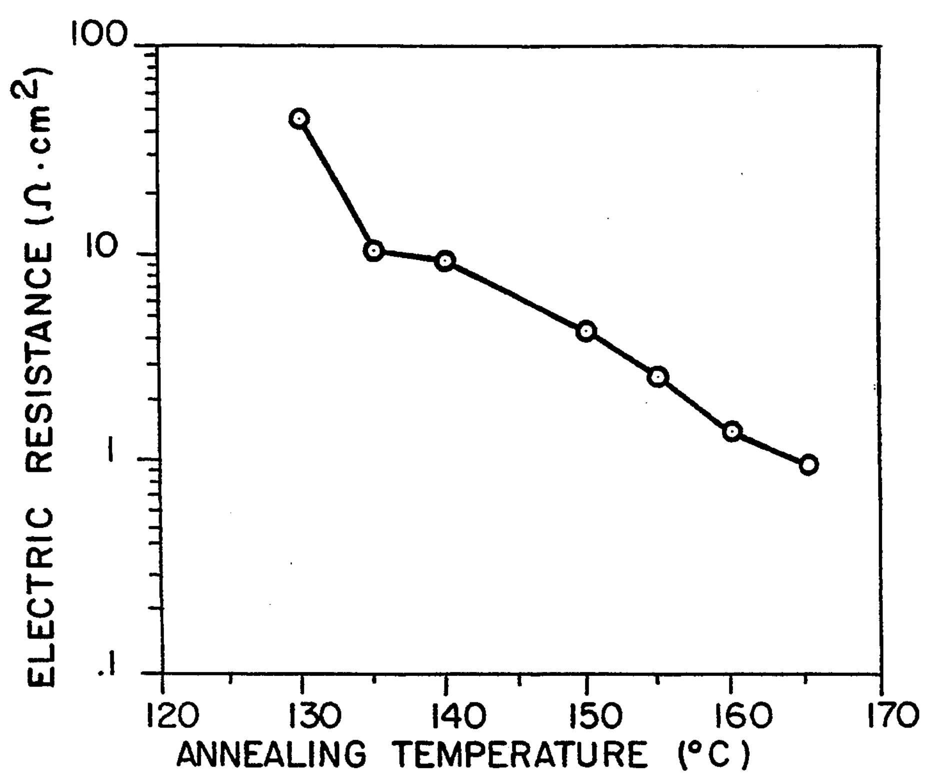
FIG. 5 is a resistivity vs. annealing temperature plot of the porous film according to the present invention.

Each of the resulting films was uniaxially stretched in the longitudinal direction at 25° C. to a stretch ratio of 200% and then subjected to heat-setting at 100° C. for 5 minutes while controlling not to change the dimension in the stretching direction. The resistivity of the resulting film was measured at room temperature. The results obtained are shown in FIG. 5.

EXAMPLE 5

Isotactic PP (mp: 166° C., Mw/Mn=8.5, MI: 2.5) and low-density PE (mp: 127° C., Mw/Mn=3.8, MI: 2.1, d: 0.935) were melt-mixed at a weight ratio of 65:35 and extruded from a T-die extruder (lip gap: 2.5 mm) at a die temperature of 230° C., a take-off speed of 40 m/min, and a draft ratio of 180 to obtain a film of continuous length. The resulting film was highly transparent and had a thickness of 28 μm.

The film was subjected to annealing at 165° C. for 5 minutes, uniaxially stretched in the longitudinal direction at 25° C. to a stretch ratio of 200%, and then stretched in the same direction at 100° C. to a stretch ratio of 175%. The stretched film was shrunk at 100° C. to a percent shrinkage of 10% based on the length in the stretching direction and then further subjected to heat setting at 100° C. for 5 minutes while controlling not to change the dimension in the stretching direction to obtain a white porous film.

The resulting porous film had a pearly luster. Observation of a longitudinal section (section C in FIG. 1) under TEM revealed a phase separation structure comprising independent PP portion and PE portion in which the PP portion formed a porous continuous phase interspersed with the PE portion forming a non-porous discontinuous phase.

The largest pore in the PP portion had a shorter diameter of about 0.05 μm and a longer diameter of about 0.25 μm as measured by the surface observation under SEM.

Figure 6:
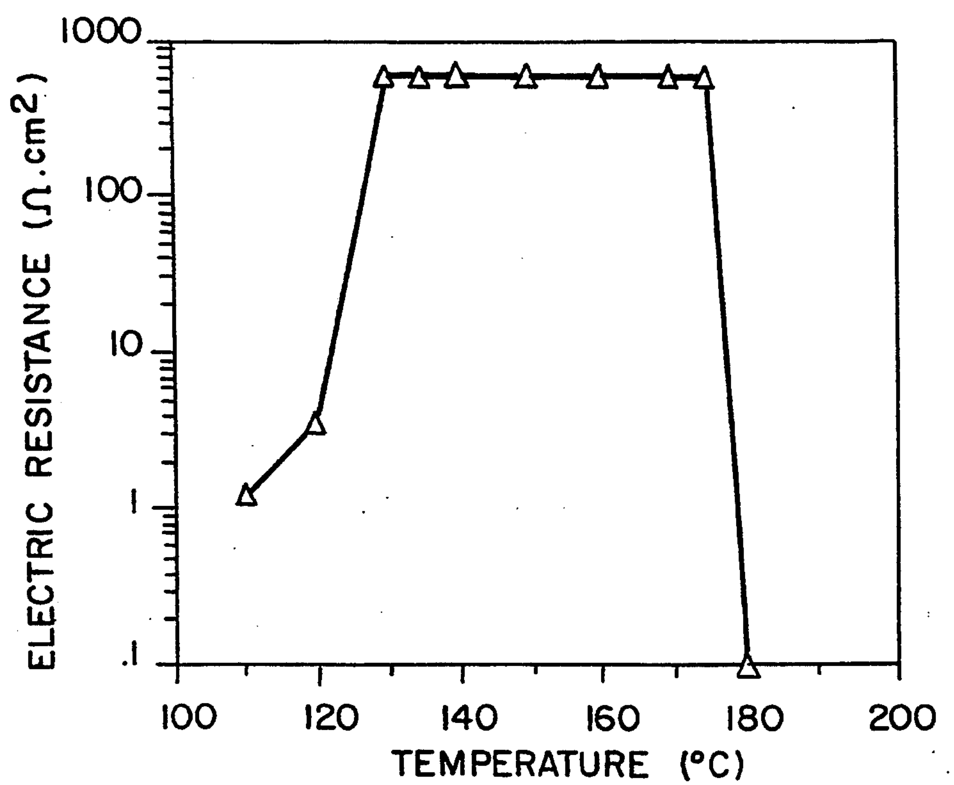
FIG. 6 is a graph showing the SD characteristics of the porous film according to the present invention.

The porous film had a thickness of 17 μm, a resistivity of 1.5 Ω.cm$^2$, and a satisfactory appearance free from unevenness. The SD characteristics of the porous film are shown in FIG. 6.

EXAMPLE 6

A 39 μm thick film of continuous length was obtained in the same molding method as in Example 1, except for using high-density PE having an mp of 138° C., an Mw/Mn ratio of 9.2, an MI of 1.2, and a d of 0.966.

The resulting film was subjected to annealing at 165° C. for 1 hour and uniaxially stretched in the longitudinal direction at 25° C. to a stretch ratio of 200% and then in the same direction at 110° C. to a stretch ratio of 100%. The stretched film was shrunk at 110° C. to a percent shrinkage of 17% based on the length in the stretching direction and further subjected to heat setting at 100° C. for 5 minutes while controlling not to change the dimension in the stretching direction to obtain a white porous film.

The porous film assumed a pearly luster. The microstructure of the film as observed on a longitudinal section and a cross section under TEM was substantially the same as observed in Example 1, except that the PE portion forming the discontinuous phase had a thickness of about 0.05 to 0.5 μm.

As a result of surface observation under SEM, the largest pore in the PP portion had a shorter diameter of about 0.1 μm and a longer diameter of about 0.2 μm, and the largest pore in the PE portion had a shorter diameter of about 0.5 μm and a longer diameter of about 2.0 μm.

The porous film had a thickness of 25 μm, a satisfactory appearance free from unevenness, a tensile modulus of 4,200 kg/cm$^2$ in the stretching direction, and a resistivity of 1.8 Ω.cm$^2$. The SD characteristics of the porous film were substantially equal to those of FIG. 2.

EXAMPLE 7

A 40 μm thick film of continuous length was obtained in the same molding method as in Example 2, except for setting the draft ratio at 155.

The film was subjected to annealing at 170° C. for 1 hour and uniaxially stretched in the longitudinal direction at 25° C. to a stretch ratio of 200% and then in the same direction at 95° C. to a stretch ratio of 200%. The stretched film was made to shrink at 95° C. to a percent shrinkage of 20% based on the length in the stretching direction and was further subjected to heat setting at 95° C. for 2 minutes while controlling not to change the dimension in the stretching direction to obtain a white porous film.

The resulting porous film assumed a pearly luster. The microstructure of the film as observed on a longitudinal section and a cross section under TEM was substantially the same as observed in Example 1.

As a result of surface observation under SEM, the largest pore in the PP portion had a shorter diameter of about 0.1 μm and a longer diameter of about 0.3 μm, and the largest pore in the PE portion had a shorter diameter of about 0.2 μm and a longer diameter of about 2.0 μm.

The porous film had a thickness of 27 μm, a satisfactory appearance free from unevenness, a tensile modulus of 6,100 kg/cm$^2$ in the stretching direction, and a resistivity of 0.72 Ω.cm$^2$. The SD characteristics of the porous film were substantially equal to those of FIG. 3.

EXAMPLE 8

Isotactic PP (mp: 163° C., Mw/Mn=9.4, MI: 2.5) and an equal weight of high-density PE (mp: 139° C., Mw/Mn=8.6, MI: 0.75, d: 0.962) were melt-mixed and molded from a T-die extruder (lip gap: 2.3 mm) at a die temperature of 250° C., a take-off speed of 15 m/min, and a draft ratio of 160 to obtain a 25 μm thick film.

The resulting film was subjected to annealing at 165° C. for 10 minutes and uniaxially stretched in the longitudinal direction at 25° C. to a stretch ratio of 180% and then in the same direction at 95° C. to a stretch ratio of 70%. The stretched film was made to shrink at 95° C. to a percent shrinkage of 14% based on the length in the stretching direction and was further subjected to heat setting at 95° C. for 2 minutes while controlling not to change the dimension in the stretching direction to obtain a white porous film.

The microstructure of the resulting porous film was substantially the same as observed in Example 1.

The porous film had a thickness of 18 μm, a satisfactory appearance free from unevenness, and a resistivity of 3.1 Ω.cm². The SD characteristics of the porous film were substantially equal to those of FIG. 2.

EXAMPLE 9

The same PP as used in Example 1 and the same PE as used in Example 6 were melt-mixed at a weight ratio of 70:30 and molded from a T-die extruder (lip gap: 2.0 mm) at a die temperature of 220° C., a take-off speed of 27 m/min, and a draft ratio of 100 to obtain a 38 μm thick film.

The film was sandwiched in between a pair of polyethylene terephthalate films (thickness: 50 μm) and brought into contact with a metal roll having a surface temperature of 155° C. for 1 minute to conduct annealing. The film was then stretched in the longitudinal direction at 25° C. to a stretch ratio of 100% and then in the same direction at 95° C. to a stretch ratio of 130% by means of a roll stretching machine. The stretched film was made to shrink at 115° C. to a percent shrinkage of 25% based on the length in the stretching direction to obtain a white porous film.

The resulting porous film assumed a pearly luster. The microstructure of the film as observed on a longitudinal section and a cross section under TEM was substantially the same as observed in Example 1, except that the PE portion forming the discontinuous phase had a thickness of about 0.05 to 0.4 μm.

As a result of surface observation under SEM, the largest pore in the PP portion had a shorter diameter of about 0.05 μm and a longer diameter of about 0.1 μm, and the largest pore in the PE portion had a shorter diameter of about 0.1 μm and a longer diameter of about 0.4 μm (because part of the pores on the film surface were found to have been collapsed, the pore size measurements were made on the part except the collapsed part).

The porous film had a thickness of 28 μm, a tensile modulus of 3,600 kg/cm² in the stretching direction, and a resistivity of 1.6 Ω.cm². The SD characteristics of the porous film were substantially equal to those of FIG. 4.

Comparative Example 5

The film of continuous length obtained by molding in Example 1 was subjected to annealing at 130° C. for 2 hours. The film was then stretched in the longitudinal direction at 25° C. to a stretch ratio of 100% and then at 100° C. to a stretch ratio of 150% in the same direction. The stretched film was subjected to heat setting at 100° C. for 2 minutes while controlling the dimension in the stretching direction. The resulting film had a thickness of 24 μm and a resistivity of 20 Ω.cm².

Comparative Example 6

The film obtained by molding in Example 1 was subjected to annealing at 180° C. for 1 hour in the same manner as in Example 1. The resulting film was too brittle to be stretched.

Comparative Example 7

Figure 7:
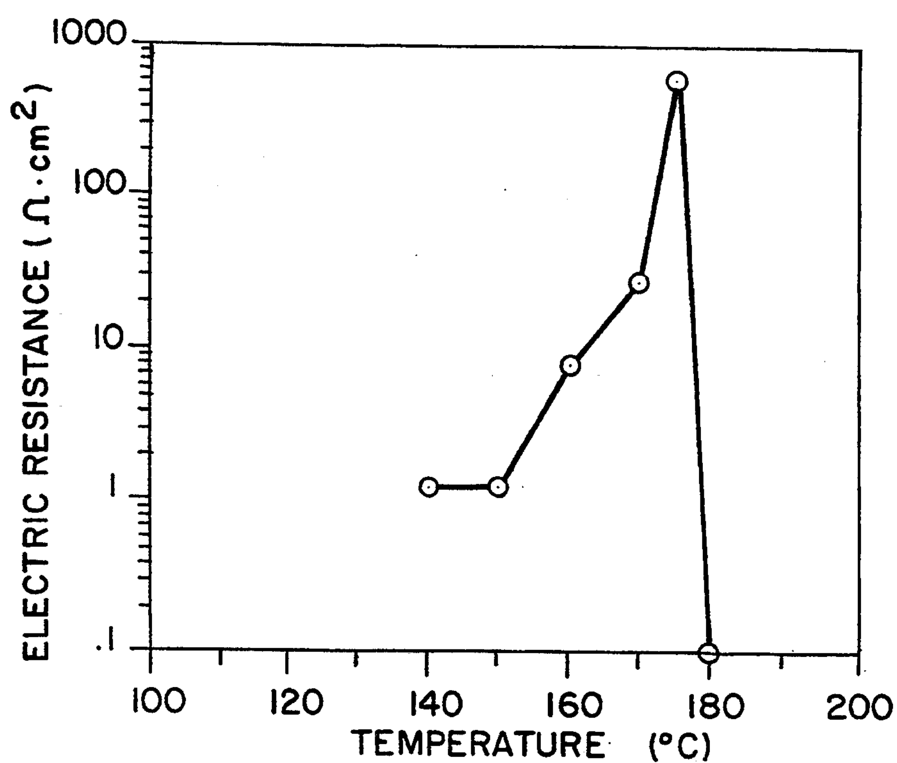
FIGS. 7 to 10 are each a graph showing the SD characteristics of a conventional separator.

A commercially available PP porous film (thickness: 25 μm, porosity: 45%) was examined for electric resistance and SD characteristics The tensile modulus was 6,400 kg/cm², and the resistivity was 0.73 Ω.cm². The SD characteristics of the film were as shown in FIG. 7.

Comparative Example 8

A 18 μm thick PE film of continuous length was obtained by molding in the same manner as in Example 8, except for using no PP.

The resulting PE film was subjected to annealing at 120° C. for 30 minutes and then uniaxially stretched at 25° C. to a stretch ratio of 200% in the longitudinal direction. The stretched film was subjected to heat setting at 110° C. for 5 minutes under control of the dimension in the stretching direction to obtain a uniformly whitened porous film.

Figure 8:
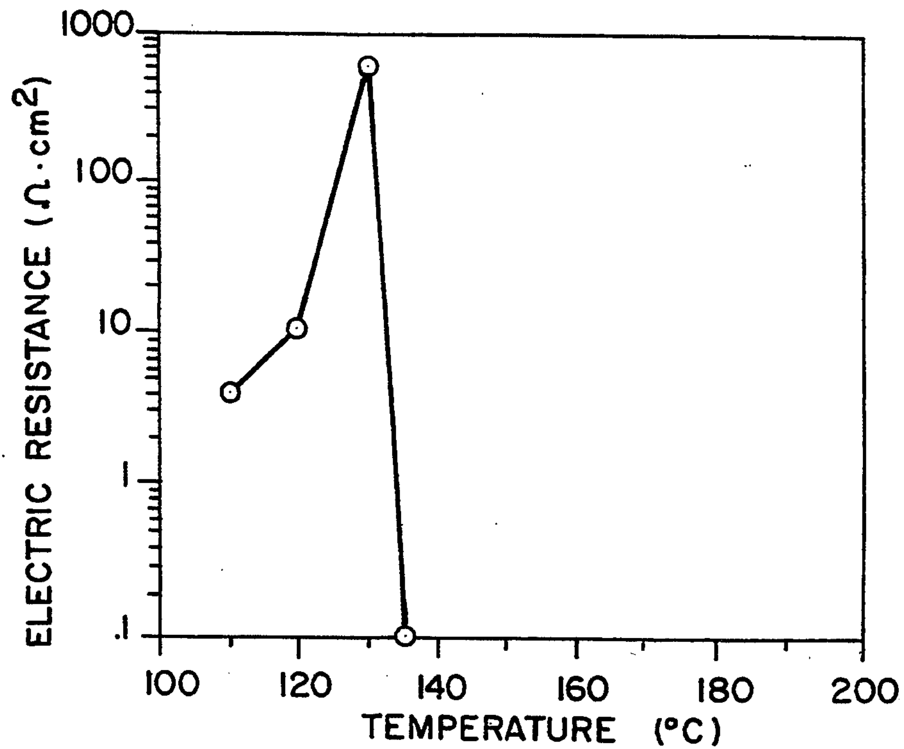

The porous film had a thickness of 14 μm, a tensile modulus of 3,300 kg/cm² in the stretching direction, and a resistivity of 0.76 Ω.cm². The SD characteristics of the porous film are shown in FIG. 8. It is seen from FIG. 8 that the porous PE film has a low heat resistance temperature and gives rise to a safety problem.

Comparative Example 9

50 g of high-density PE (viscosity-average molecular weight: 50,000, mp: 136° C. d: 0 95) were dissolved in a mixed solvent of 1,000 g of xylene and 1,000 g of decalin at 120° C. To the solution was added ultrahigh-molecular PE powder having a viscosity-average molecular weight of 3,000,000, and the mixture was heated to 140° C. to form a solution. The solution was extruded at a T-die temperature of 135° C. into a 60 μm thick film of continuous length, cooled in methanol for 1 minute, and wound around a roll. The film in roll form was immersed in methanol for 10 minutes to extract xylene and decalin, followed by drying in air.

The film was then stretched in the longitudinal direction at 100° C. to a stretch ratio of 200% by means of a roll stretching machine to obtain a porous film.

Figure 9:
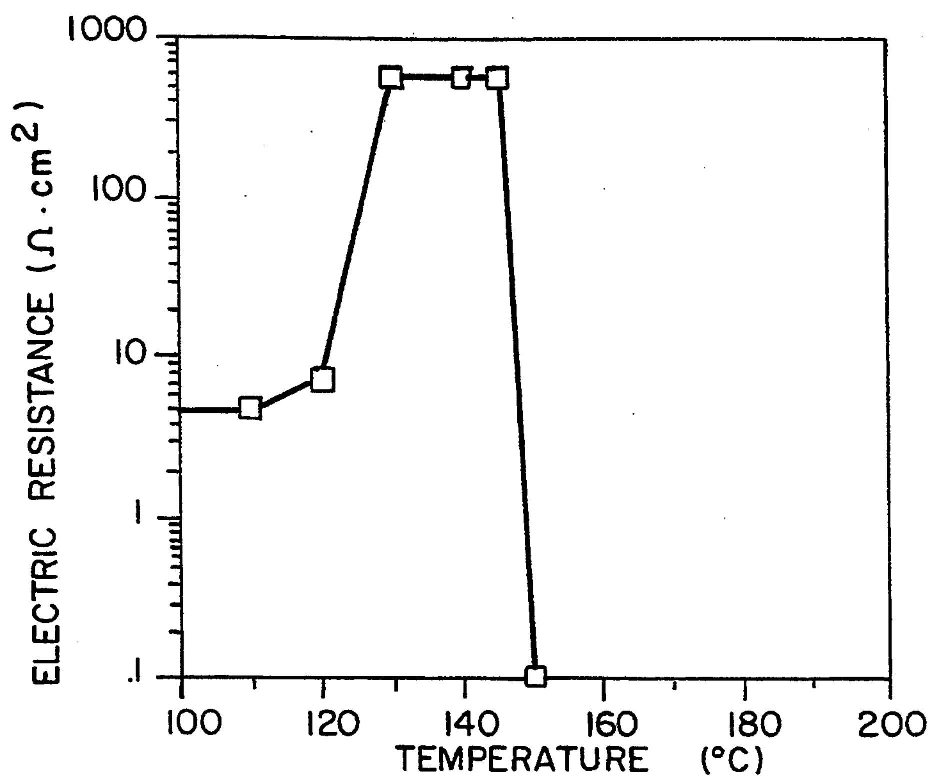

The resulting porous film had a thickness of 25 μm, a resistivity of 4.2 Ω.cm², and a tensile modulus of 3,450 kg/cm² in the stretching direction. The SD characteristics of the porous film were as shown in FIG. 9.

Comparative Example 10

Figure 10:
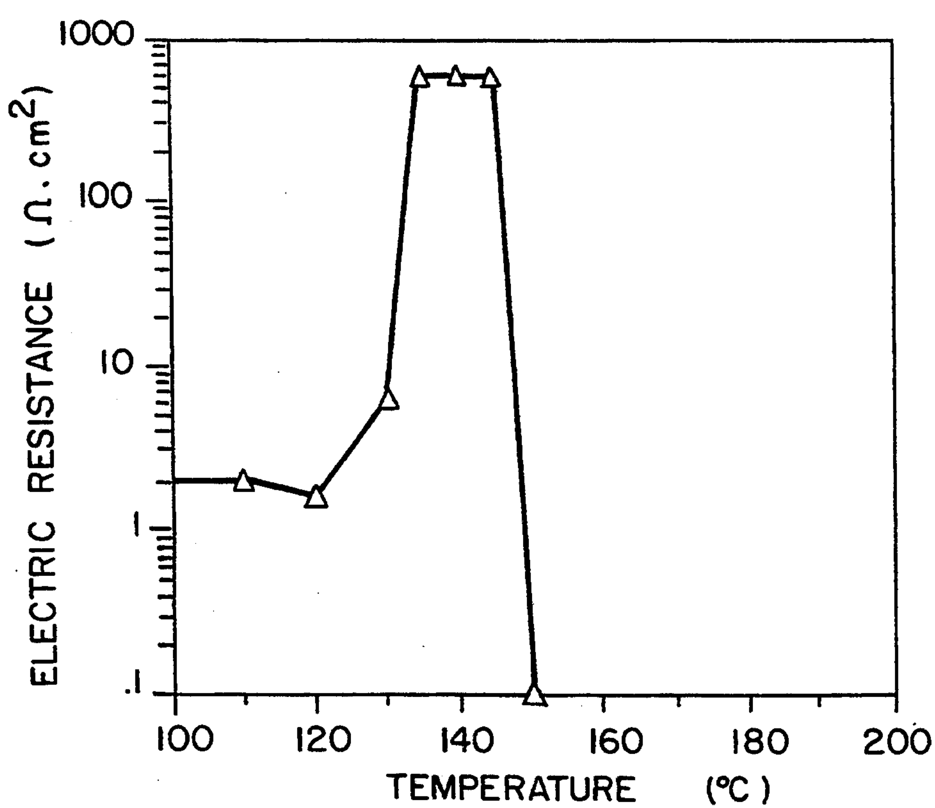

SD characteristics of a commercially available PE porous film are shown in FIG. 10. This film had a thickness of 35 μm, a resistivity of 1.2 Ω.cm² at room temperature, and a tensile modulus of 3,200 kg/cm².

According to the present invention, a porous film having a high tensile modulus, a satisfactory appearance, and a uniform thickness can be produced. The porous film of the invention, when used as a battery separator, exhibits low electric resistance, an appropriate SD initiation temperature, a high heat resistance temperature, and a broad heat resistance range and is therefore of high safety.

According to the process of the present invention, the above-described porous film can be produced through simple and easy steps.

While the invention has been described in detail and with reference to specific examples thereof, it will be apparent to one skilled in the art that various changes and modifications can be made therein without departing from the spirit and scope thereof.

What is claimed is:

1. A porous film comprising a composition comprising polypropylene and polyethylene, the polypropylene being present in a proportion of from 10 to 90% by weight based on the total weight of polypropylene and polethylene, the polyethylene being present in a proportion of from 90 to 10% by weight based on the total weight of polypropylene and polyethylene, and the polyethylene having a weight average molecular weight (Mw) to number average molecular weight (Mn) ratio, Mw/Mn, of 10 or less as measured by high-temperature gel-permeation chromatography;

said porous film having a phase separation structure in which a polypropylene portion and a polyethylene portion independently exist, either one of said polypropylene portion and said polyethylene portion forming a continuous phase, with the other forming a discontinuous phase, and said continuous phase being porous;

said porous film having a resistivity of 5 $\Omega.cm^2$ or less as measured in an organic electrolytic solution at room temperature; and said porous film, when heated to a specific temperature in a range of from 120° to 150° C. having a resistivity of 200 $\Omega.cm^2$ or higher and maintaining said resistivity up to a temperature of at least 25° C. higher than said specific temperature.

2. A porous film as claimed in claim 1, wherein said film has a tensile modulus of 3,500 $kg/cm^2$ or more in at least one direction.

3. A porous film as claimed in claim 1, wherein said film further contains a surface active agent.

4. A porous film as claimed in claim 1, wherein said continuous phase comprises polypropylene and said discontinuous phase comprises polyethylene.

5. A porous film as claimed in claim 1, wherein said discontinuous phase has a porous structure.

6. A porous film as claimed in claim 1, wherein said discontinuous phase is a thin layer having a thickness of 2 μm or less.

7. A porous film as claimed in claim 4, wherein said film has a tensile modulus of 3,500 $kg/cm^2$ or more in at least one direction.

8. A porous film as claimed in claim 2, wherein said film further contains a surface active agent.

9. A battery separator comprising a porous film comprising polypropylene and polyethylene, the polypropylene being present in a proportion of from 10 to 90% by weight based on the total weight of polypropylene and polyethylene, the polyethylene being present in a proportion of from 90 to 10% by weight based on the total weight of polypropylene and polyethylene, and the polyethylene having a weight average molecular weight (Mw) to number average molecular weight (Mn) ratio, Mw/Mn, of 10 or less as measured by high-temperature gel-permeation chromatography;

said porous film having a phase separation structure in which a polypropylene portion and a polyethylene portion independently exist, either one of said polypropylene portion and said polyethylene portion forming a continuous phase, with the other forming a discontinuous phase, and said continuous phase being porous;

said porous film having a resistivity of 5 $\Omega.cm^2$ or less as measured in an organic electrolytic solution at room temperature; and said porous film, when heated to a specific temperature in a range of from 120° to 150° C., having a resistivity of 200 $\Omega.cm^2$ or higher and maintaining said resistivity up to a temperature of at least 25° C. higher than said specific temperature.

10. A battery separator, according to claim 9 which increases its resistivity in an organic elecrolytic solution to 200 $\Omega.cm^2$ or higher upon being heated to a temperature of from 120° to 150° C. and, at the same time, changes from a porous structure into a substantially non-porous structure and retains the resistivity of 200 $\Omega.cm^2$ or higher up to a temperature higher than the temperature at which it changes into a non-porous structure by at least 25° C.

* * * * *